June 21, 1949.  R. D. HARWOOD  2,473,585
SALT AND PEPPER SHAKER
Filed Feb. 9, 1946
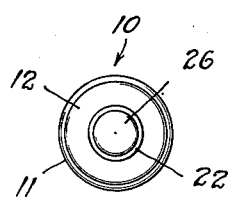
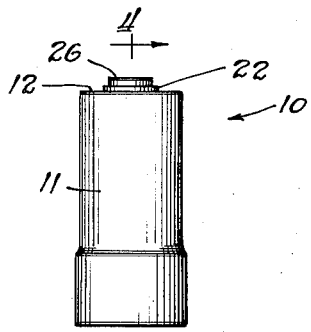
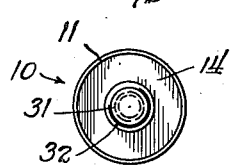
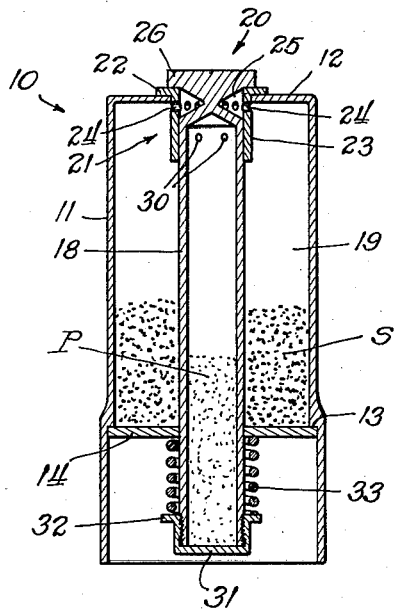
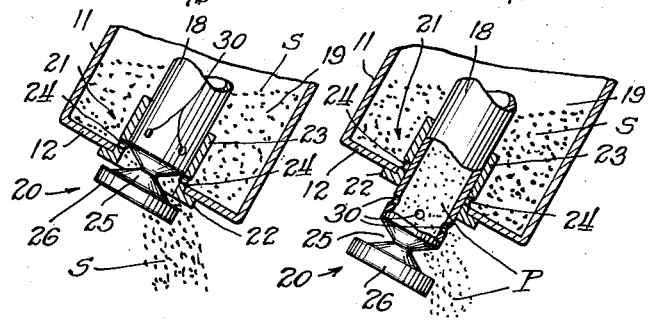
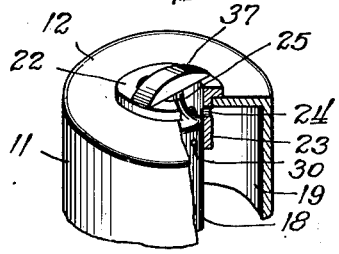
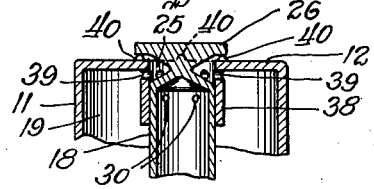
Inventor:
Ray D. Harwood.
By Brown, Jackson, Boettcher & Dienner
Attys.

Patented June 21, 1949

2,473,585

UNITED STATES PATENT OFFICE 2,473,585

SALT AND PEPPER SHAKER

Ray D. Harwood, Elkhart, Ind.

Application February 9, 1946, Serial No. 646,635

6 Claims. (Cl. 65—45)

My invention relates, generally, to dispensing means and it has particular relation to means for selectively dispensing condiments, such as salt or pepper and the like, from a single utensil, such as a combination salt and pepper shaker.

The object of my invention, generally stated is to provide a combination salt and pepper shaker which shall be simple and efficient in operation and which may readily and economically be manufactured and used.

Another object is to provide for selectively dispensing salt and pepper or the like from a single utensil that can be grasped readily and operated manually by one hand.

A further object of my invention is to employ one of the chambers making up the utensil not only to hold one of the condiments but also to provide a valve action with another chamber of the utensil holding another condiment so that the relative positions of the chambers determine which of the condiments is to be dispensed or that neither of them is to be dispensed.

Still another object is to hold the chambers in the relative retracted positions.

Other objects of my invention will, in part, be obvious and in part appear hereinafter.

My invention is disclosed in the embodiments thereof shown in the accompanying drawing and it comprises the features of construction, combination of elements and arrangement of parts which will be exemplified in the constructions hereinafter set forth and the scope of the application of which will be indicated in the appended claims.

For a more complete understanding of the nature and scope of my invention reference may be had to the following detailed description taken in connection with the accompanying drawing in which:

Figure 1 is a view, in side elevation, of a preferred embodiment of my invention showing a combination salt and pepper dispenser;

Figure 2 is a top plan view of the utensil shown in Figure 1;

Figure 3 is a bottom plan view of the utensil shown in Figure 1;

Figure 4 is a detail sectional view, at an enlarged scale, taken along the line 4—4 of Figure 1;

Figure 5 is a detail sectional view of a portion of the dispenser shown in the preceeding figures, the parts being shown in the position in which salt, for example is dispensed from one of the chambers;

Figure 6 is a view, similar to that of Figure 5, showing the relative relation of the chambers for dispensing pepper, for example, the dispensing of salt being prevented;

Figure 7 is a perspective view of a modification of the construction shown in the preceding figures; and Figure 8 is a detail sectional view of the upper end portion of another modification of the combination dispensing utensil shown in Figures 1 through 6.

Referring now particularly to Figures 1 through 4 of the drawing, it will be noted that the reference character 10 designates, generally, a utensil for dispensing two condiments, such as salt or pepper and the like. The utensil 10 may comprise two chambers one of which is formed in part by a hollow body member or hollow cylindrical holder 11, which has at one end an integrally formed annular flange 12. Near the other end there is provided a step 13 against which a washer 14 can react to form a closure for that end of the member or holder 11.

The other chamber may be formed by a tubular holder 18 which is slidably and coaxially mounted in the member or holder 11. The holder 18 together with the member or holder 11 provides an annular space 19 in which a condiment, such as salt, as indicated at S, may be positioned. The tubular holder 18 is also arranged to receive a condiment, such as pepper, as indicated at P.

At its upper end the tubular holder 18 is provided with a head portion, shown generally at 20. This head portion 20 and the upper end of the tubular holder 18 are guided by an insert, indicated generally at 21, which may comprise a radially extending flange 22, bearing against the outer surface of the flange 12, and an integrally formed inwardly extending tubular flange 23.

In order to provide for communication between the annular space 19 and the exterior of the member or holder 11, cooperating ports are provided in the flange 23 and the head portion 20. It will be observed that radial ports or apertures 24 are provided for this purpose in the tubular flange 23 and that an annular groove 25 is provided in the head portion 20 underneath a disc portion 26. It will be understood that the disc portion 26 not only serves in combination with the flange 22 to provide a closure for the ports 24 and groove 25 but also that it serves as a stop for limiting the inward movement of the tubular holder 18 with respect to the member or holder 11. The manner in which the tubular holder 18 is operated to permit the dispensing of salt from the annular space 19 will be described presently.

In order to dispense the contents of the tubular holder 18, radial ports or apertures 30 are provided therein adjacent the head portion 20. When the tubular holder 18 occupies the position shown in Figure 4, it will be noted that the ports or apertures 30 are closed off by the tubular flange 23, thus preventing egress of the pepper P from the tubular holder 18. At its other end the tubular holder 18 may have a threaded cap 31 for closing the same and to permit filling thereof.

With a view to maintaining the tubular holder 18 in the position shown in Figure 4, the cap 31 has a radial flange 32 between which, and the washer 14, there is positioned a coil compression spring 33. It will be understood that the spring 33 serves to bias the tubular holder 18 to the position shown. At the same time it permits relative movement between the tubular holder 18 and the member or holder 11 for selectively dispensing the salt or pepper as may be desired.

The relative positions of the member or holder 11 and the tubular holder 18 for dispensing salt, for example, are illustrated in Figure 5. As there shown, the utensil has been turned substantially upside down and the tubular holder 11 has been depressed, as by application of the thumb to the cap 31, a sufficient amount so that the disc portion 26 is lifted off of the flange 22. The interior of the annular space 19 is then placed in communication with the exterior of the utensil through the ports 24 and the annular groove 25. As illustrated, the salt S may be shaken from the utensil in a continuous stream as long as the tubular holder 18 is held in this position. It will be noted that, while the tubular holder 18 is held in the position for dispensing salt, the apertures 30 therein are still covered by the tubular flange 23 so that dispensing of the contents of the tubular holder 18 is prevented.

When it is desired to dispense the pepper P from the tubular holder 18, the latter is moved still further through the member or holder 11, such as to the position shown in Figure 6 of the drawing. In this position it will be understood that the spring 33 may be substantially entirely collapsed or may be solid. Further it will be noted that the ports 24 in the tubular flange 23 are closed off by the body of the tubular holder 18, thereby preventing further dispensing of the salt and that the ports 30 are uncovered so that the pepper P may be dispensed as illustrated.

On release of pressure from the tubular holder 18 as applied through the cap 31, the spring 33 retrieves the tubular holder 18 to the position shown in Figure 4. Here both sets of ports 24 and 30 are effectively closed off so that the contents of neither of the two chambers can be dispensed.

In the embodiment of the invention shown in Figure 7 of the drawing the tubular holder 18 terminates at its upper end in a transverse bar portion 37. When this construction is employed, the ports 24 are in communication with the exterior of the member or holder 11 through the annular groove 25, even when the holder 18 is in the fully retracted position. This permits the contents of the annular space 19 to be dispensed without requiring that the tubular holder 18 be depressed or moved. However, when it is moved through the member or holder 11, the ports 24 are first closed off and then on further movement, the ports 30 are uncovered to permit the dispensing of the contents of the tubular holder 18 in the manner described hereinbefore.

In Figure 8 of the drawing there is shown another form of the invention. As there illustrated, instead of employing the insert 21, as shown in Figure 4, as a separate part, the member or holder 11 may be provided with an integrally formed inwardly extending tubular flange 38 in which ports or apertures 39, corresponding to the ports or apertures 24 of Figures 1 through 6, may be located. These ports or apertures 39 cooperate with the annular groove 25 for dispensing the contents of the annular space 19, as previously described. If it is desired to dispense the contents of the annular space 19 without requiring movement of the tubular holder 18, projections 40 may be provided, as shown, from the annular flange 12. It will be noted that the projections 40 may be integrally formed with the flange 12 and that they are spaced about its inner circumference. They serve to space the disc portion 26 a slight distance away from the face of the flange 12, the spaces therebetween thus forming an extension of the annular groove 25.

The parts making up the utensil described hereinbefore may be formed of non-corrosive metal or of plastic, as may be desired. The spring 33, of course, is formed of metal, preferably of a non-corrosive character.

Since certain further changes can be made in the foregoing constructions and different embodiments of the invention can be made without departing from the spirit and scope thereof, it is intended that all matter shown on the accompanying drawing or described hereinbefore shall be interpreted as illustrative and not in a limiting sense.

I claim as my invention:

1. A holder for dispensing separately salt and pepper or the like comprising, in combination, a hollow body member, a tubular holder slidably mounted in said body member for receiving the pepper and forming with said body member a space for receiving the salt, and a tubular flange extending inwardly from one end of said body member for guiding said tubular holder and having ports therein for dispensing salt, said tubular holder having a plurality of ports closed off by said tubular flange when said tubular holder is in retracted position, said tubular holder closing off the ports in said tubular flange when the tubular holder is moved through the flange to uncover the ports in said tubular holder.

2. A condiment holder for dispensing separately salt and pepper or the like comprising, in combination, a hollow cylindrical holder, a tubular holder coaxially and slidably mounted in said cylindrical holder for receiving the pepper and forming with said cylindrical holder an annular space for receiving the salt, an annular flange at one end of said cylindrical holder for closing one end of said annular space; a tubular flange extending inwardly from said annular flange, having ports communicating with said annular space, and slidably supporting one end of said tubular holder; a head at said one end of said tubular holder having a circumferential groove therein registering with said ports and arranged to place the same in communication with the exterior of said cylindrical holder when said head is moved by said tubular holder to a predetermined position for dispensing the salt, said tubular holder having ports adjacent said head arranged to be placed in communication with the exterior of said cylindrical holder when said tubular holder is moved beyond said predetermined position for dispensing the pepper; a washer forming a closure for the other end of said annular space, disposed intermediate the ends of said cylindrical holder, and arranged to be removed for filling said annular space with salt; a cap removably mounted on the other end of said tubular holder to permit filling the same with pepper, a coil compression spring reacting between said washer and said cap, and stop means limiting the relative movement of said holders as caused by said spring to position said circumferential groove in said head and said ports in said tubular holder entirely within said annular flange whereby the flow of salt and pepper is prevented.

3. A condiment holder for dispensing separately salt and pepper or the like comprising, in combination, a hollow cylindrical holder, a tubular holder coaxially and slidably mounted in said cylindrical holder for receiving the pepper and forming with said cylindrical holder an annular space for receiving the salt, an annular flange at one end of said cylindrical holder for closing one end of said annular space; a tubular flange extending inwardly from said annular flange, having ports communicating with said annular space, and slidably supporting one end of said tubular holder, a head at said one end of said tubular holder including a centrally disposed transverse bar portion constituting a stop for reacting against said annular flange and having a circumferential groove underneath said bar portion registering with said ports for placing the same in communication with the exterior of said cylindrical holder past the side of said bar to dispense salt, there being ports in said tubular holder adjacent said head arranged to be closed off by said tubular flange and to be uncovered when said tubular holder is moved outwardly of said cylindrical holder to dispense pepper, and means for maintaining said holders in predetermined relative position.

4. A condiment holder for dispensing separately salt and pepper or the like comprising, in combination, a hollow cylindrical holder, a tubular holder coaxially and slidably mounted in said cylindrical holder for receiving the pepper and forming with said cylindrical holder an annular space for receiving the salt, an annular flange at one end of said cylindrical holder for closing one end of said annular space and having a plurality of outwardly extending projections around the inner circumference thereof; a tubular flange extending inwardly from said annular flange, having ports communicating with said annular space, and slidably supporting one end of said tubular holder; a head at said one end of said tubular holder including a disc portion constituting a stop for reacting against said projections from said annular flange and having a circumferential groove underneath said disc portion registering with said ports for placing the same in communication with the exterior of said cylindrical holder through the spaces between said disc portion and said projections to dispense salt, there being ports in said tubular holder adjacent said head arranged to be closed off by said tubular flange and to be uncovered when said tubular holder is moved outwardly of said cylindrical holder to dispense pepper, and means for maintaining said holders in predetermined relative position.

5. A dispensing device for dispensing separately salt and pepper or the like comprising, in combination, a hollow holder for salt, a hollow holder for pepper, the pepper holder being carried by wall means of the salt holder and being adapted to be reciprocated therein, cooperating passageways in the holder members which, when in alignment, permit salt to be dispensed therethrough to the exterior of the device, and another passageway in the pepper holder for dispensing pepper, said other passageway being blocked by said wall means when the two holders are aligned in salt dispensing position, and said pepper holder being slidable to a pepper dispensing position wherein said other passageway is unblocked from said wall means of the salt holder and the passageway of the salt holder is blocked by the wall of the pepper holder.

6. A dispensing device for dispensing separately salt and pepper comprising, in combination, a hollow body member for salt, a vertically extending tubular guide member extending inwardly of said hollow member and communicating with the exterior of said body member, a generally horizontally disposed port in said tubular guide member providing communication between the hollow body member and the tubular guide member, a tubular holder for pepper slidable vertically in the tubular guide member, a generally horizontally disposed port in the tubular holder, said tubular holder being selectively movable between a position wherein the wall of the tubular guide member blocks the port in the tubular holder and a position wherein the port in the tubular holder discharges to the exterior of the hollow body member and the wall of the tubular holder blocks the port in the tubular guide member, and means biasing said body member and tubular holder against relative movement.

RAY D. HARWOOD.

REFERENCES CITED

The following references are of record in the file of this patent:

UNITED STATES PATENTS

| Number | Name | Date |
|---|---|---|
| 160,157 | Camp | Feb. 23, 1875 |
| 688,209 | Svendsgaard | Dec. 3, 1901 |
| 913,028 | Meaker | Feb. 23, 1909 |
| 934,493 | Wolkenstein | Sept. 21, 1909 |
| 997,060 | Hedrich | July 4, 1911 |
| 1,208,099 | Cornell | Dec. 12, 1916 |
| 1,965,919 | Bieger et al. | July 10, 1934 |
| 2,125,629 | Gallo | Aug. 2, 1938 |

FOREIGN PATENTS

| Number | Country | Date |
|---|---|---|
| 12,314 | Great Britain | July 20, 1891 |